Feb. 22, 1949.                C. L. MERSHON                2,462,207
                       TEMPERATURE REGULATING SYSTEM
Filed May 28, 1947                                    2 Sheets-Sheet 1

WITNESSES:
Robert C. Baird
Wm. C. Groome

INVENTOR
Clarence L. Mershon.
BY
James N. Ely
ATTORNEY

Feb. 22, 1949.   C. L. MERSHON   2,462,207
TEMPERATURE REGULATING SYSTEM
Filed May 28, 1947                    2 Sheets-Sheet 2
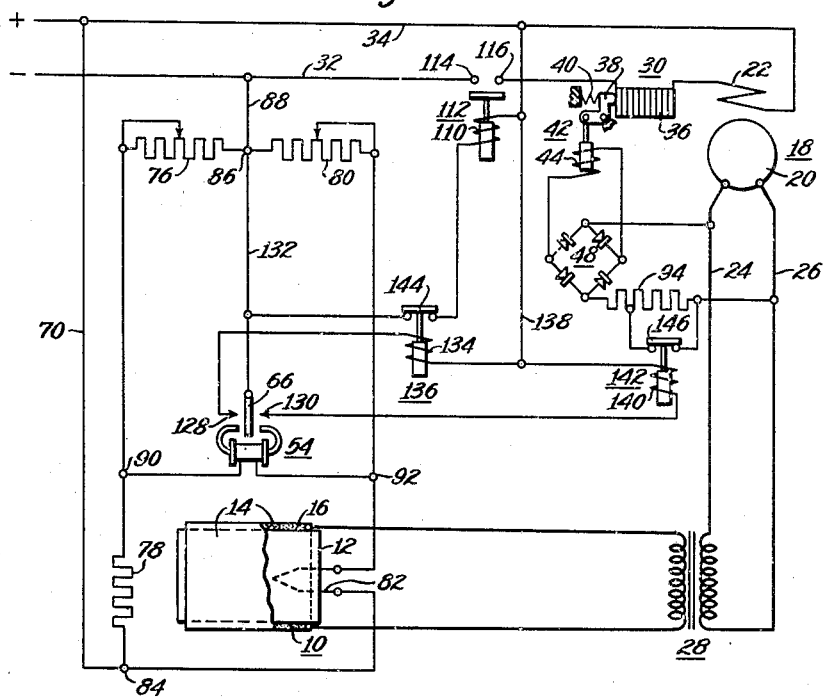
WITNESSES:
Robert C. Baird
N. W. C. Groove
INVENTOR
Clarence L. Mershon.
BY
James K. Ely
ATTORNEY Patented Feb. 22, 1949

2,462,207

UNITED STATES PATENT OFFICE 2,462,207

TEMPERATURE REGULATING SYSTEM

Clarence L. Mershon, Lima, Ohio, assignor to Westinghouse Electric Corporation, East Pittsburgh, Pa., a corporation of Pennsylvania Application May 28, 1947, Serial No. 750,904

5 Claims. (Cl. 219—20)

This invention relates to regulating systems, and in particular to a system for preventing the frosting of windows.

In the aircraft industry considerable efforts have been made to prevent the frosting of windows. The conditions encountered in service by such windows are quite variable, rendering the problem difficult to solve. Recently a window glass manufacturer has produced a windowpane formed of laminated sections of plastic and glass in which the surface of one or more panes of glass is coated with a transparent conducting material, which when connected in an electrical circuit will act as a resistor and dissipate heat within the window. In practice, the variable weather conditions encountered have rendered it difficult to maintain a constant temperature in such windows with the result that under certain weather temperature conditions the window is satisfactorily defrosted, while under other conditions, the window becomes so frosted as to render it non-transparent.

An object of this invention is to provide for regulating the temperature of a window exposed to various weather conditions to prevent frosting thereof.

Another object of this invention is to provide for heating a window at a substantially constant temperature.

A more specific object of this invention is to provide, in a system for heating a window, for controlling the input to the window heater in accordance with changes in temperature of the window from a predetermined temperature which is to be maintained.

A further specific object of this invention is to provide a regulating system having a resistance bridge circuit sensitive to changes in temperature for detecting variations in the temperature of a window for effecting a corrective action to change the power input to a resistance heating element associated with the window.

Other objects of this invention will become apparent from the following description when taken in conjunction with the accompanying drawings, in which:

Figures 1, 2, 3 and 4 are diagrammatic views of apparatus and circuits involving the teachings of this invention.

Figure 1:
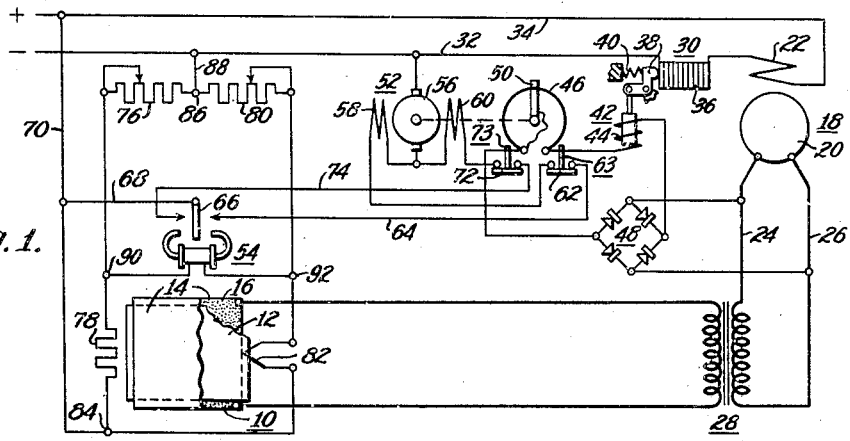

Referring to the drawings, and in particular to Fig. 1 thereof, this invention is illustrated by reference to a system for controlling the temperature of a windowpane 10. The windowpane 10 in this instance is formed of a layer of plastic 12 sandwiched between two layers of glass 14, one layer of glass having a coating 16 formed of a conductive material which will function as a resistor element therebetween. Such a windowpane 10 is more fully described in Technical Glass Bulletin #15 of the Pittsburgh Plate Glass Company of Pittsburgh, Pennsylvania. The composition of the layers 12, 14 and 16 may be of many different materials so long as the combination acts as a transparent windowpane and the conductive layer 16 functions as a resistor element or has resistor elements embedded therein as described hereinafter.

In order to supply current to the layer 16 of conductive material to effectively heat the windowpane 10, a generator 18 is provided, the generator being disposed to be driven by a suitable prime mover, not shown, and being formed of armature windings 20 and field windings 22. The armature windings 20 are connected by conductors 24 and 26 to the primary windings of a transformer 28, the secondary windings of which are connected to terminals formed on the intermediate layer 16 of conductive material. As illustrated the field windings 22 are connected through a pile resistor 30 and by conductors 32 and 34 to a suitable source of direct current supply represented by the positive and negative symbols.

In this instance the pile resistor 30 is of the usual construction having a pile 36 formed of a plurality of discs of high resistance material such as carbon or the like and being disposed to be compressed by means of the crank lever 38 which is normally biased to apply pressure thereto by a spring 40 and disposed to be moved to release the pressure by an electromagnet 42. The electromagnet 42 is provided with a winding 44 which is disposed to be connected through a slide wire rheostat 46 across the output terminals of a full-wave rectifier 48, the input terminals of which are connected across the conductors 24 and 26, whereby the winding 44 is normally supplied in accordance with the output of the generator 18.

In order to control the energization of the winding 44, the sliding contact member 50 of the slide wire rheostat 46 is disposed to be actuated by a reversible motor 52 which is connected to be operated in accordance with the energization of a polarized relay 54. As illustrated the reversible motor 52 comprises the armature windings 56 and opposed field windings 58 and 60, one terminal of the armature windings being connected to conductor 32 and the other terminal being selectively connected through field winding 58, contact member 62 of a limit switch 63, conductor 64, the armature contact member 66 of the polarized relay 54 and conductors 68 and 70 to conductor 34, or through field winding 60, contact member 72 of a limit switch 73, conductor 74, the armature contact member 66 of the polarized relay 54 and conductors 68 and 70 to the conductor 34. The contact members 62 and 72 of the limit switches 63 and 73, respectively, are disposed to be actuated to open circuit position depending upon the direction of and the extent of movement of the sliding contact member 50 of the slide wire rheostat 46, thereby effectively limiting the operation of the slide wire rheostat 46.

As illustrated, the polarized relay 54 is disposed to be directly energized in accordance with the unbalanced condition of a resistance bridge formed of resistors 76, 78, 80 and 82. As illustrated, the resistors 76 and 78 comprise one leg of the resistor bridge, resistors 80 and 82 forming the other leg, the two legs being connected at their intermediate points 84 and 86 by conductors 70 and 88 to conductors 34 and 32, respectively. As illustrated, the energizing winding of the polarized relay 54 is connected to intermediate taps 90 and 92 in the legs of the resistance bridge.

In this embodiment the resistor 82 is formed of any material having a high temperature coefficient of resistance, such as nickel wire, the resistor being represented as being disposed closely adjacent to the windowpane 10 and, where possible, embedded in the plastic layer 12 of the window so that the resistance of the resistor 82 will vary directly as the temperature of the windowpane 10 varies from a predetermined temperature which is to be maintained. On the other hand, the resistors 76, 80 and 78 are preferably formed of material having a low temperature coefficient of resistance, such as Advance, the resistor 78 also preferably being positioned close to the windowpane 10 so that the leads to the resistors 78 and 82 will be approximately equal to eliminate errors in resistance within the bridge itself. The resistance bridge can be initially balanced by suitably adjusting the resistors 76 and 80. The same effect can be obtained by making the resistance of leads 90 to 78 plus 78 to 84 equal to resistance of leads 84 to 82 plus 82 to 92.

In operation, assuming that the layer 16 of the windowpane 10 is connected to be supplied from the generator 18 and that the resistance bridge has been properly balanced to maintain a predetermined temperature within the window, the system is as shown with the polarized relay 54 deenergized and the armature contact member 66 thereof in a mid-position.

Assuming that the temperature of the windowpane 10 decreases from the predetermined temperature which it is desired to maintain, then the resistance of resistor 82 decreases in accordance with the temperature decrease with the result that the polarity of the mid-terminal 92 of the resistance bridge becomes more positive with respect to the polarity of the mid-terminal 90 and current flows from the mid-terminal 92 through the winding of the polarized relay 54 to the mid-terminal 90. When the winding of the polarized relay 54 is energized in this manner, the armature contact member 66 is moved to the left to close a circuit which extends from the conductor 34 through conductors 70 and 68, armature contact member 66 of the relay 54, conductor 74, contact member 72 of the limit switch 73, field winding 60 and armature windings 56 to the conductor 32 to so energize the reversible motor 52 as to drive the sliding contact member 50 in a counterclockwise direction to increase the resistance of the rheostat 46 in circuit with the energizing winding 44 of electromagnet 42, whereby the spring member 40 functions to apply more pressure to the pile 36 of the pile rheostat 30 and thereby increase the flow of current through the field winding 22 of the generator 18. As the excitation of the generator 18 is thus increased, the flow of current therefrom to the conductive layer 16 of the windowpane is increased to thereby effect an increase in the temperature of the windowpane 10 to return such temperature to the predetermined temperature which is to be maintained.

On the other hand, if the temperature variation of the windowpane 10 is an increase in temperature, then the resistance of the resistor element 82 increases in accordance with the increase in temperature, whereby the polarity of the mid-terminal 90 becomes more positive with respect to the potential of the mid-terminal 92 and current flows through the winding of the polarized relay 54 in a direction to actuate the armature contact member 66 of the relay 54 to the right to close a circuit which extends from conductor 34 through conductors 70 and 68, armature contact member 66, conductor 64, contact member 62 of the limit switch 63, field winding 58 and armature windings 56 of the reversible motor 52 to conductor 32, whereby the motor 52 is energized to drive the sliding contact member 50 in a clockwise direction to decrease the resistance in circuit with the winding 44 of the electromagnet 42, whereby the electromagnet 42 operates in opposition to the spring member 40 to release the pressure on the pile 36 of the rheostat 30 and thereby increase the resistance thereof and decrease the flow of current through the field winding 22. As the excitation of the generator 18 is thus decreased, the flow of current from the generator 18 to the conducting layer 16 of the windowpane 10 is decreased whereby the temperature developed within the windowpane 10 is decreased towards the predetermined temperature which is to be maintained.

It is apparent that the operation of the system described is effective for controlling or regulating the temperature of the windowpane 10 for as the resistance in the winding circuit of the electromagnet 42 is varied, the output of the generator 18 is correspondingly varied tending to return the ampere turns of the winding 44 of the electromagnet 42 to its initial value to establish the balance between the magnetic pull of the electromagnet 42 and the pressure of the spring 40 and thereby regulate the pressure applied to the pile 36 of the pile rheostat 30. The response of the system is very sensitive, being directly controlled by the temperature variations within the windowpane 10.

Figure 2:
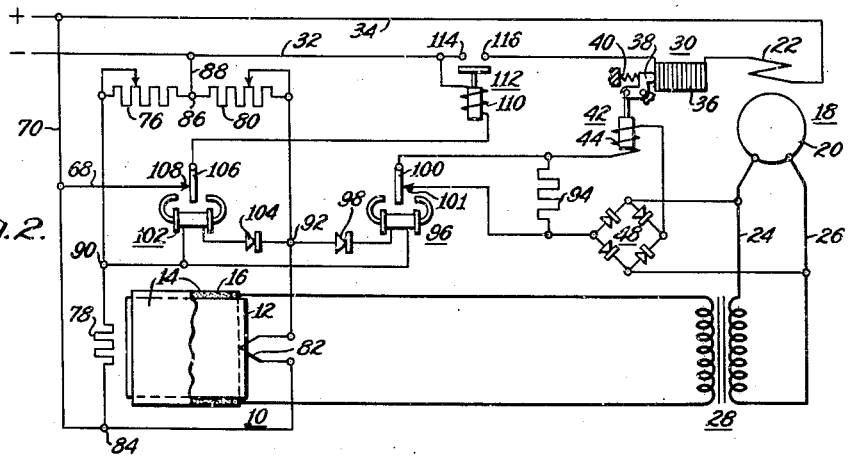

The system shown in Fig. 2 is a simplified circuit for accomplishing substantially the same result as is accomplished with the circuit of Fig. 1. In this embodiment, the same numerals are utilized for indicating identical portions of the circuit as has been described heretofore with respect to Fig. 1. In this instance, however, a fixed resistor 94 is utilized instead of the slide wire rheostat 46 of Fig. 1, the connections of the fixed resistor 94 in circuit with the winding 44 of the electromagnet 42 being directly controlled by the energization of the relay 96 which is connected across the mid-terminals 90 and 92 of the resistance bridge, a rectifier 98 being provided in circuit with the winding of the relay 96 to control the direction of flow of current therethrough. As illustrated, the fixed resistor 94 is normally shunted from the winding circuit by the armature contact member 100 of polarized relay 96 which for a balanced condition of the resistance bridge is in circuit closing position with a fixed contact member 101.

In addition to the polarized relay 96, a second relay 102 is provided for controlling the energizing circuit of the field winding 22 of the generator 18 under predetermined operating conditions. In this instance, the relay 102 is disposed with its winding connected through a rectifier 104 across the mid-terminals 90 and 92 of the resistance bridge, the armature contact member 106 of the relay 102 being normally in circuit closing position with fixed contact member 108 to close an energizing circuit to the winding 110 of a relay 112, the contact member of which normally bridges contact members 114 and 116.

In operation, assuming that the armature contact member 106 is in engagement with contact member 108 to energize the winding 110 of relay 112 so that the field winding 22 of generator 18 is energized and that the bridge has been adjusted so that it is in balance at a predetermined temperature within the windowpane 10, then assuming that the temperature of the windowpane decreases so that the potential at midterminal 92 is more positive with respect to the potential at mid-terminal 90, current flows through the rectifier 98 and the winding of the polarized relay 96 to the mid-terminal 90 to energize the relay 96 and actuate its armature contact member 100 to a circuit opening position away from the fixed contact member 102. As the circuit is interrupted by reason of the movement of armature contact member 100, resistor 94 is connected in series with the winding 44 of the electromagnet 42, whereby the magnetic pull of electromagnet 42 is decreased and the spring member 40 functions to apply more pressure to the pile 36 of the pile rheostat 30 to effectively increase the current flow through the field winding 22. As the excitation of the generator 18 is thus increased, the current flow to the conducting coating 16 of the windowpane 10 is increased to effect an increase in the temperature within the window.

On the other hand, if the temperature of the window pane 10 is increased above the predetermined temperature which is to be maintained, then the potential at mid-terminal 90 becomes more positive with respect to the potential of the mid-terminal 92 and current flows from the terminal 90 through the winding of the relay 102, rectifier 104 to the terminal 92 to so energize the relay 102 as to actuate the armature contact member 106 to the right, away from the fixed contact member 108 to interrupt the energizing circuit to the winding 110 of relay 112, whereby relay 112 functions to permit its contact member to drop away from the contact members 114 and 116, thereby interrupting the circuit to the field winding 22 to effect the deenergization thereof. The interruption of the energizing circuit of field winding 22, of course, interrupts the flow of current from the generator 18 to the conducting coating 16 of the windowpane 10, whereby the temperature of the window decreases towards the predetermined temperature which is to be maintained.

As in the embodiment of Fig. 1, the circuit illustrated in Fig. 2 is likewise very sensitive to temperature changes and is prompt and positive in its operation to effect an increase or decrease in the temperature of the windowpane 10 to maintain a predetermined temperature which is required.

Figure 3:
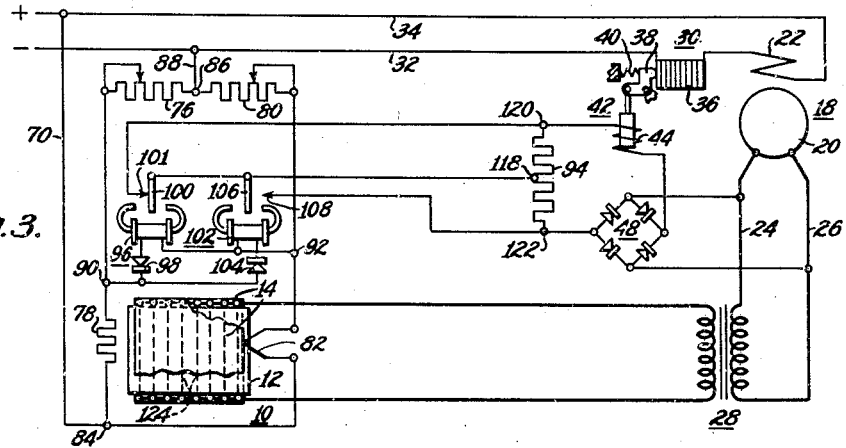

The embodiment of the invention illustrated in Fig. 3 is somewhat similar to that shown in Fig. 2, a more sensitive control of the energization of the winding 44 of relay 42, however, being obtained. In this instance, the connection of sections of the resistor 94 is controlled directly by polarized relays 96 and 102, the resistor 94 being provided with a mid-terminal 118 which is connected to the armature contact members 100 and 106 of the relays 96 and 102, respectively. As illustrated, the section of the resistor 94 connected between terminals 120 and 118 is disposed to be normally shunted by the engagement of armature contact member 100 and fixed contact member 101 when the resistance bridge is balanced, whereas the section of resistor 94 between terminals 122 and 118 is disposed to be normally connected in circuit with the winding 44 when the resistance bridge is in a normal balanced condition. The windowpane 10 is similar to the windowpanes 10 of Figs. 1 and 2 except that in this instance, a plurality of wire resistors 124 is utilized being connected through terminal leads and being disposed to be connected in parallel circuit relation with each other. The wire resistors 124 can be embedded in the plastic layer in any of the well-known manners.

Assuming that the circuit is balanced as shown and that the temperature of the windowpane 10 is at the predetermined operating temperature which is to be maintained, then if the temperature of the windowpane should decrease so as to effect a decrease in the resistance of resistor 82, the mid-terminal 92 becomes more positive with respect to the potential of the mid-terminal 90 and current flows from terminal 92 through the winding of relay 96, rectifier 98 to the mid-terminal 90 of the resistance bridge circuit to so energize the relay 96 as to actuate its contact member 100 away from the fixed contact member 101 to connect the section of resistor 94 between terminals 120 and 118 in circuit with the winding 44 of electromagnet 42. As the magnetic pull of electromagnet 42 is thus decreased, the spring member 40 functions to apply more pressure to the pile 36 of the rheostat 30 to thereby decrease its resistance and increase the flow of current in the field winding 22. As the energization of the field winding 22 is thus increased, the output of the generator 18 is increased to supply more current to the resistor elements 124 within the windowpane 10 to increase the temperature of the window towards the predetermined temperature which is to be maintained.

On the other hand, if the temperature within the windowpane 10 increases from the predetermined temperature which is to be maintained so that the resistance of resistor 82 increases, then the potential at mid-terminal 90 becomes more positive with respect to the potential at mid-terminal 92 and current flows from the terminal 90 through the rectifier 104, the winding of relay 102 to the mid-terminal 92 whereby the relay 102 is energized to effect a movement of the armature contact member 106 to the right to engage fixed contact member 108 and thereby effectively shunt the section of resistor 94 between terminals 118 and 122 from the winding circuit of the electromagnet 42. As the resistance is thus regulated for the winding circuit of electromagnet 42, the magnetic pull increases to release the pressure on the pile 36 of the rheostat 30 and thereby increase the resistance in circuit with the field winding 22 to decrease the energization thereof. As the energization of the generator 18 is thus decreased, the current flow to the intermediate layer 16 and the resistor wires 124 therein is decreased whereby the temperature developed within the pane 10 is decreased towards the predetermined temperature which is to be maintained.

The system illustrated in Fig. 4 is somewhat similar to the system of Fig. 2, in that a relay 112 is disposed to be energized under predetermined conditions to connect the field winding 22 of the generator 18 to be energized. Also, a resistor 94 is utilized in circuit relation with the energizing winding 44 of the regulator electromagnet 42 for controlling the degree of energization thereof. In this embodiment, a polarized relay 54 is disposed to be energized to actuate its pivoted armature contact member 66 in a predetermined direction, depending upon the polarity of the potential at mid-terminals 90 and 92, to selectively engage fixed contact members 128 and 130. The pivoted armature member 66 is connected through conductors 132 and 88 to supply conductor 32.

The fixed contact member 128 is connected through the energizing winding 134 of a control relay 136 and conductor 138 to supply conductor 34; whereas, the fixed contact member 130 is connected through the energizing winding 140 of a control relay 142 and conductor 138 to supply conductor 34. The contact member 144 of relay 136 is normally disposed, when the winding 134 is deenergized, in a contact-making position to establish an energizing circuit for the relay 112, which circuit extends from conductor 34 through conductor 138, the energizing winding 110 of relay 112, contact member 144 of control relay 136, and conductors 132 and 88 to the supply conductor 32. When the relay 112 is thus energized, its movable contact member bridges contact members 114 and 116 to establish the energizing circuit for the field winding 22 of the generator 18.

The contact member 146 of control relay 142 is also normally disposed, when the energizing winding 140 thereof is deenergized, in a contact-making position to establish a shunt about a section of the resistor 94 to effect an increase in the flow of current through the energizing winding 44 of the regulator electromagnet 42.

In operation, assuming that the resistance bridge including the element 82 is balanced for a given temperature which is to be maintained in the windowpane 10, the pivoted armature contact member 66 of the polarized relay 54 is in the position shown, and the relay 112 is therefore energized to close the supply circuit to the generator field winding 22. If the temperature of the windowpane 10 should then decrease from the predetermined temperature which is to be maintained, the resistance bridge becomes unbalanced as described hereinbefore; and, with the windings of the polarized relay 54 disposed thereon in a predetermined manner, as the polarity of the mid-terminal 92 becomes more positive with respect to the polarity of the mid-terminal 90, current flows from the terminal 92 through the winding of the relay 54 to the terminal 90 to actuate the armature contact member 66 into engagement with the fixed contact member 130.

When the contact members 66 and 130 are in engagement, the energizing circuit for winding 140 of the control relay 142 is established and the relay 142 is so energized that its contact member 146 is actuated to an open circuit position to thereby remove the shunt from the section of the resistor 94 and connect all of the resistor 94 in circuit relation with the energizing winding 44 of the electromagnet 42. As the magnetic pull of the electromagnet 42 is thus decreased, the spring member 40 functions to effect a compression of the stack of discs 36 to decrease the resistance in circuit with the field winding 22. As the field excitation is thus increased, the flow of current from generator 18 to the conductive layer 16 is increased to thereby effect an increase in the temperature of the windowpane 10 and return the temperature to the predetermined tmperature which is to be maintained.

If the change in the temperature of the windowpane 10 should be an increase, then the polarized relay 54 is energized to actuate the armature contact member 66 into engagement with the fixed contact member 128 to establish the energizing circuit for the winding 134 of the control relay 136. When thus energized, the movable contact member 144 of relay 136 is actuated to a circuit-interrupting position to thereby effect the deenergization of the winding 110 of relay 112. As the relay 112 is thus deenergized, the contact member thereof drops to a circuit-interrupting position, and the field winding 22 of generator 18 is deenergized. Since the flow of current from generator 18 then ceases, the temperature of the windowpane 10 decreases to the predetermind temperature which is to be maintained. Of course, as the resistance bridge including the resistor 82 again becomes balanced by the effect of the return of the temperature of the windowpane 10 to the predetermined temperature which is to be maintained, the polarized relay 54 becomes deenergized and its pivoted armature contact member 66 is returned to the neutral position shown, and relay 112 is again energized to establish the supply circuit for the field winding 22 of the generator 18.

In the systems described hereinbefore, if it is desired to use a temperature sensing element 82 which has a negative temperature coefficient, such as carbon, the connections of the polarized relays or of the relays polarized by means of directional rectifiers and circuits therewith are reversed from those shown, so as to obtain similar results or operation of the systems to effect the operations as described hereinbefore.

All of the systems described hereinbefore are very sensitive and give a quick response to changes in temperature away from the predetermined temperature which is to be maintained to thereby effect a required defrosting of a windowpane or to prevent the frosting thereof. In the embodiments described, it is possible to utilize either a conductive coating or an intermediate layer having resistor wires therein within the windowpane 10; and the term "resistor heating element," as used in the appended claims, should therefore be given its broadest meaning as covering any heating element or medium for generating heat within the windowpane 10.

The systems utilize standard equipment and can be readily duplicated. As can be appreciated, it is only necessary that the generator provide a minimum amount of power necessary for maintaining the windows at the desired or required temperature, with the result that there is little power drain from the direct-current system utilized for the field excitation of the generator and an increase in the life of the generator is obtained. The temperature of the window can be maintained at any required temperature, it being found in practice that the resistance bridge can be readily adjusted so as to maintain any predetermined temperature between 70° F. and 120° F. with very slight adjustments of the resistors 76 and 80. As will be readily understood, the system is self-balancing for any given condition of outside temperature.

I claim as my invention:

1. In a system for regulating the temperature of a window having a resistor heating element associated therewith, in combination, a generator connected to be operated to deliver current to the resistor heating element, a field winding for the generator, a rheostat connected in circuit relation with the field winding and disposed to be operated to control the excitation of the generator, a relay having a winding disposed to be energized in response to the operation of the generator to control the operation of the rheostat, a resistor connected in circuit relation with the relay winding, a pair of relays polarized by rectifiers disposed to be selectively energized to control the connections of the resistor in circuit with the relay winding, and a resistance bridge circuit having a resistor disposed in juxtaposition to the window, said juxtaposed resistor having a high temperature coefficient of resistance whereby the resistance varies as the temperature of the window varies, the polarized relays being connected across the resistance bridge circuit to be selectively energized in accordance with the direction of unbalance thereof.

2. In a system for regulating the temperature of a window having a resistor heating element associated therewith, in combination, a generator connected to be operated to deliver current to the resistor heating element, a field winding for the generator, a rheostat connected in circuit relation with the field winding and disposed for operation to control the excitation of the generator, a winding having resistance in circuit relation therewith disposed to be energized in accordance with the operation of the generator to control the operation of the rheostat, means responsive to directional changes in temperature of the window to produce a directional electrical output, means responsive to the directional electrical output occasioned by a decrease in the temperature from a predetermined value for varying the resistance in circuit with the winding, and means responsive to a predetermined electrical output occasioned by an increase in the temperature from a predetermined value for interrupting the field winding circuit of the generator.

3. In a system for regulating the temperature of a window having a resistor heating element associated therewith, in combination, a generator connected to be operated to deliver current to the resistor heating element, a field winding for the generator, a rheostat connected in circuit relation with the field winding and disposed to be operated to control the excitation of the generator, a relay having a winding disposed to be energized in response to the operation of the generator to control the operation of the rheostat, a resistor connected in circuit relation with the relay winding, a resistance bridge circuit having a resistor disposed in juxtaposition to the window, said juxtaposed resistor having a high temperature coefficient of resistance whereby the resistance varies as the temperature of the window varies to give a directional output from the bridge circuit as the temperature of the window departs from a predetermined value, a polarized relay disposed to be energized from the bridge circuit as the temperature of the window is decreased below the predetermined value to connect at least a part of the relay resistor in circuit with the relay winding, and another polarized relay disposed to be energized from the bridge circuit as the temperature of the window increases above the predetermined value to effect an interruption of the field winding circuit of the generator.

4. In a system for regulating the temperature of a window having a resistor heating element associated therewith, in combination, a generator connected to supply current to the resistor heating element, a field winding for the generator, a rheostat connected in the field winding circuit and disposed for operation to control the excitation of the generator, a contactor disposed when energized to establish the field winding circuit, a winding disposed to be energized to control the operation of the rheostat, a resistor connected in circuit relation with the winding, a pair of relays disposed to be selectively energized, one of the relays being disposed to normally connect said contactor to be energized, the other of the relays being disposed to normally shunt at least a portion of said resistor, means responsive to directional changes in temperature of the window from a predetermined temperature to produce a directional electrical output, and means responsive to the directional electrical output to selectively energize one or the other of the pair of relays depending upon the direction of departure of the temperature of the window from the predetermined temperature.

5. In a system for regulating the temperature of a window having a resistor heating element associated therewith, in combination, a generator connected to supply current to the resistor heating element, a field winding for the generator, a rheostat connected in the field winding circuit and disposed for operation to control the excitation of the generator, a contactor disposed when energized to establish the field winding circuit, a winding disposed to be energized to control the operation of the rheostat, a resistor connected in circuit relation with the winding, a pair of relays disposed to be selectively energized, one of the relays being disposed to normally connect said contactor to be energized, the other of the relays being disposed to normally shunt at least a portion of said resistor, a resistance bridge circuit disposed to be responsive to directional changes in temperature of the window from a predetermined temperature to produce a directional electrical output, and a polarized relay disposed for operation in response to said directional electrical output to effect the selective energization of one or the other of the pair of relays depending upon the direction of departure of the temperature of the window from the predetermined temperature.

CLARENCE L. MERSHON.

REFERENCES CITED

The following references are of record in the file of this patent:

UNITED STATES PATENTS

| Number | Name | Date |
|---|---|---|
| 854,121 | Storer | May 21, 1907 |
| 1,715,750 | Gano | June 4, 1929 |
| 2,090,692 | Melton | Aug. 24, 1937 |
| 2,170,193 | Godsey, Jr. | Aug. 22, 1939 |
| 2,294,775 | Edwards et al. | Sept. 1, 1942 |
| 2,311,118 | Matthews et al. | Feb. 16, 1943 |
| 2,399,266 | Stiefel | Apr. 30, 1946 |
| 2,427,729 | Jenkins | Sept. 23, 1947 |